United States Patent
Nola (10) Patent No.: US 10,293,763 B2
(45) Date of Patent: May 21, 2019

(54) ENGINE COVER HAVING SNAP LATCH

(71) Applicant: Ford Global Technologies, LLC, Dearborn, MI (US)

(72) Inventor: Gary Nola, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 15/483,464

(22) Filed: Apr. 10, 2017

(65) Prior Publication Data

US 2018/0291804 A1    Oct. 11, 2018

(51) Int. Cl.
*B60R 13/08* (2006.01)
*F02B 77/13* (2006.01)
*F02B 77/11* (2006.01)

(52) U.S. Cl.
CPC .......... *B60R 13/0838* (2013.01); *F02B 77/11* (2013.01); *F02B 77/13* (2013.01); *B60Y 2306/09* (2013.01)

(58) Field of Classification Search
CPC ...... F02B 77/13; F02B 77/11; B60R 13/0838; B60Y 2306/09
See application file for complete search history.

(56) References Cited

U.S. PATENT DOCUMENTS

| 4,600,396 | A | * | 7/1986 | Crane | F02B 61/045 |
| | | | | | 292/247 |
| 5,803,198 | A | * | 9/1998 | Baxter | B62D 25/10 |
| | | | | | 16/282 |
| 7,226,233 | B2 | | 6/2007 | SuBenbach et al. | |
| 7,631,630 | B2 | | 12/2009 | Sedlar et al. | |
| 9,464,607 | B2 | | 10/2016 | Kulkarni et al. | |
| 2016/0294255 | A1 | * | 10/2016 | Schmit | F02B 63/044 |

FOREIGN PATENT DOCUMENTS

EP        2008883 A1    12/2008

* cited by examiner

Primary Examiner — Jacob M Amick
(74) Attorney, Agent, or Firm — LeClairRyan (57) ABSTRACT

An engine cover readily movable between a closed, engine-concealing position and an open, engine-accessing position is disclosed. The cover includes a front and a back. The back of the cover is movably attached to the engine. The front of the cover includes a latch handle assembly that releasably attaches the cover to the engine. In its closed position, the engine cover not only conceals at least a portion of the engine thereby improving the aesthetic appeal of the engine compartment, but also helps to reduce engine noise, thus reducing overall vehicle NVH. The cover back may be attached anywhere on the upper area of the engine. The latch assembly includes a releasable latch handle that is pivotably attached to the engine cover. The releasable latch handle has a latch handle hook. An engine latch hook is provided on the engine to which the latch handle hook can be selectively attached.

19 Claims, 7 Drawing Sheets

ENGINE COVER HAVING SNAP LATCH

TECHNICAL FIELD

The disclosed inventive concept relates generally to covers for vehicle engines. More particularly, the disclosed inventive concept relates to an engine cover assembly having a combination handle and latch assembly at its forward end and a pivotable attachment assembly at its rearward end. A hinge pin is integrally formed with an engine structural element, such as an intake manifold. The rearward end of the cover is pivotably attached to the hinge pin. A latch hook to which the latch assembly is selectively attached is also integrally formed with the engine structure.

BACKGROUND OF THE INVENTION

The engine compartment of the modern vehicle has an appearance that is quite different from that of its predecessors. For decades following the introduction of the motor vehicle, the engine compartment was generally ignored by designers who, instead, focused on the exterior and interior of the vehicle. The engine compartment of the production vehicle (as opposed to the show vehicle) was solely functional.

Nowadays, however, both engineers and designers are engaged to improve the overall appearance of the engine compartment while looking at ways to improve noise reduction. The general result of these efforts is the inclusion in the engine compartment of an engine cover that covers at least some of the vehicle's engine. Known covers have a variety of shapes and styles and vary in the degree to which they cover the engine. The size and material of the engine cover both have an impact on the extent to which engine noise, vibration and harshness (NVH) can be controlled.

Known methods for attaching the engine cover to the engine itself include fitting stud bolts to strategic locations on the engine, applying appropriate torque to the stud bolts, installing the engine cover, and running down attachment nuts to secure the engine cover in position. These steps add to production time and, ultimately, play a role in increasing final product cost.

Accordingly, a common challenge for the designer of the modern engine cover is the need to combine functionality and serviceability with aesthetics in the relatively small space typically provided in the modern engine compartment. Consideration must therefore be given to ease of installation to maintain competitive assembly costs and ease of removability to maintain competitive repair costs. In addition to satisfying these requirements, the attachment elements for allowing easy installation and removal must also be simple, relatively light weight, inexpensive to produce, and integrated with the cover itself.

As in so many areas of vehicle technology there is always room for improvement related to the design of engine covers and to their methods of installation.

SUMMARY OF THE INVENTION

The disclosed inventive concept overcomes the problems of known engine covers and methods for attaching and latching the covers to the engine. Particularly, the disclosed inventive concept comprises an engine cover having a front and a back. The back of the cover is movably attached to the engine. The front of the cover includes a latch handle assembly that releasably attaches the cover to the engine. The engine cover is movable between a closed position in which at least a portion of the engine is concealed and an open position in which the engine is exposed. In its closed position, the engine cover not only conceals at least a portion of the engine thereby improving the aesthetic appeal of the engine compartment, but also helps to reduce engine noise, thus reducing overall vehicle NVH.

Attachment of the engine cover assembly to the engine is made by a movable attachment such as a pivoting hinge arrangement that includes a rod and hinge pocket. The pivoting hinge arrangement may be attached anywhere on the upper area of the engine. The latch assembly includes a releasable latch handle that is pivotably attached to the engine cover. The releasable latch handle is substantially positioned in a recessed area of the engine cover. The releasable latch handle has a latch handle hook extending therefrom. An engine latch hook is provided on the engine to which the latch handle hook can be selectively attached.

The engine cover includes a latch handle assembly end to which the latch handle is pivotably attached. The latch handle assembly end includes an engine latch hook stop and the engine latch hook includes a cover stop. The stops contact one another when the engine cover is in its closed position.

The handle latch is movable between a locked or latched position and an unlocked or unlatched position. When in its locked position, the latch handle hook frictionally engages the engine latch hook. When in its unlocked position, the latch handle hook is disengaged from the engine latch hook.

Attachment of the latch handle hook to the engine latch hook is confirmed by an audible snap. In addition or in the alternative, locking or latching confirmation may be made by a visual verification system that includes an imaging device such as a camera.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for different constructed embodiments. These specific parameters and components are included as examples and are not meant to be limiting.

The accompanying figures and the associated description illustrate the engine cover according to the disclosed inventive concept. It is to be understood that the shape, size, and position of the engine cover as illustrated in the figures are suggestive and are not intended as being limiting. As a non-limiting example, the illustrated shape of the engine cover is shown as being generally rectangular but may be adapted as needed for a certain space. As a further non-limiting example, the engine cover may have an irregular shape.

Figure 1:
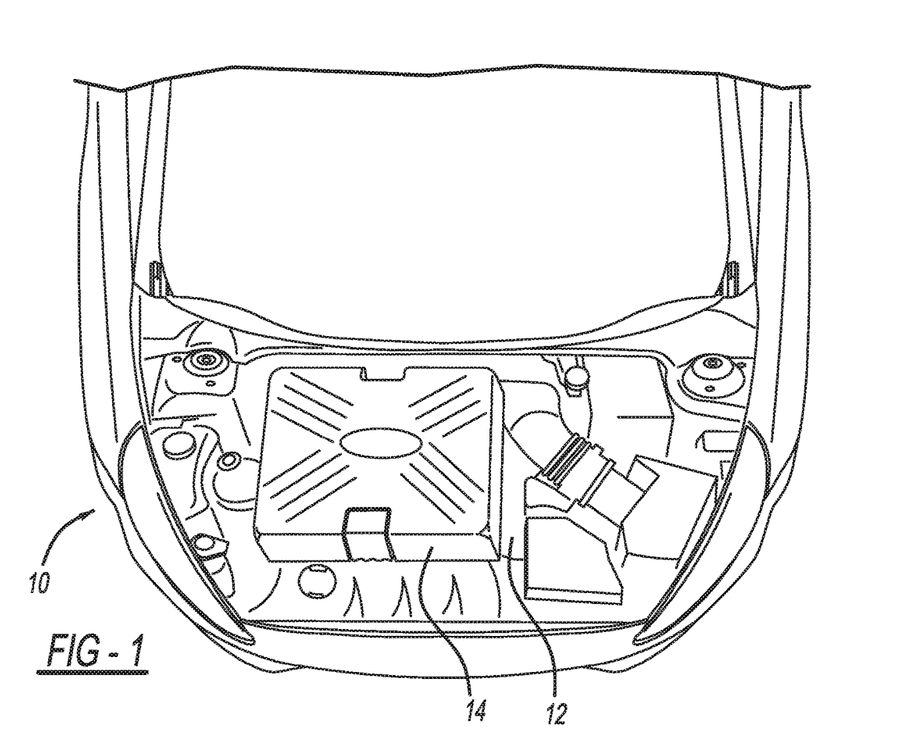
FIG. 1 is an environmental view of a vehicle engine cover according to the disclosed inventive concept in place on an engine within a vehicle's engine compartment.

Referring to FIG. 1, an environmental view of a portion of an engine compartment of a vehicle, generally illustrated as 10, is shown. The shape and size of the engine compartment 10 is suggestive and is intended as being non-limiting. Positioned substantially within the engine compartment 10 is a vehicle engine 12. The engine 12 may be of any variety of engines and may be positioned either transversely or longitudinally relative to the long axis of the vehicle. The engine 12 is of the transverse type.

A movable engine cover 14 is pivotably attached to the top of the engine 12. The movable engine cover 14 is preferably though not exclusively made of a rigid polymerized material, such as high-density polyethylene (HDPE). As noted, the shapes and sizes of the engine cover 14 as shown in the figures are only suggestive and alternative arrangements and configurations may be adopted without deviating from the underlying inventive concept as disclosed.

The placement of the engine cover 14 may be other than the position shown and may, for example, cover more or less of the engine 12. While the engine cover 14 serves the function of reducing vehicle NVH, it also provides a space for vehicle badging as shown in FIG. 1. For the sake of both ease of manufacture and permanence, the vehicle badging may be molded into the engine cover 14.

Figure 2:
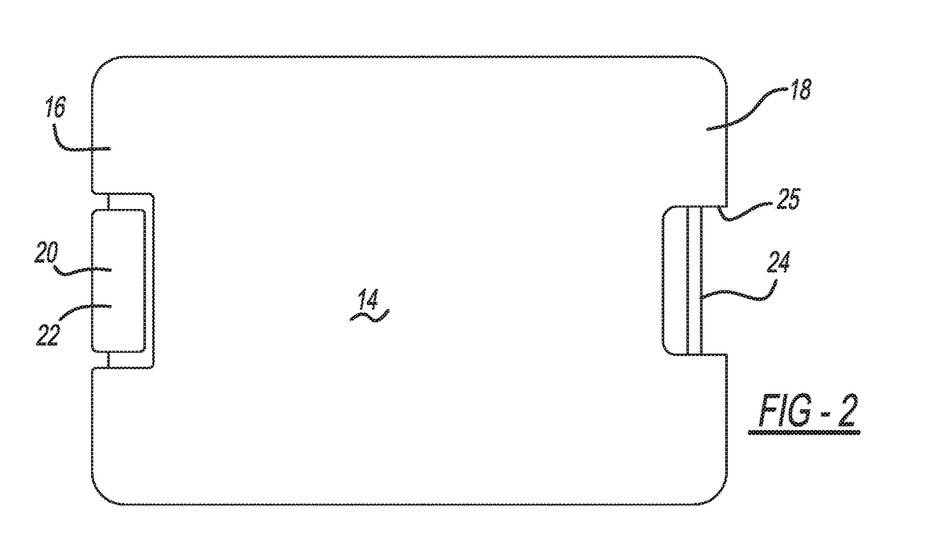
FIG. 2 is a top plan view of the engine cover of the disclosed inventive concept.
Figure 3:
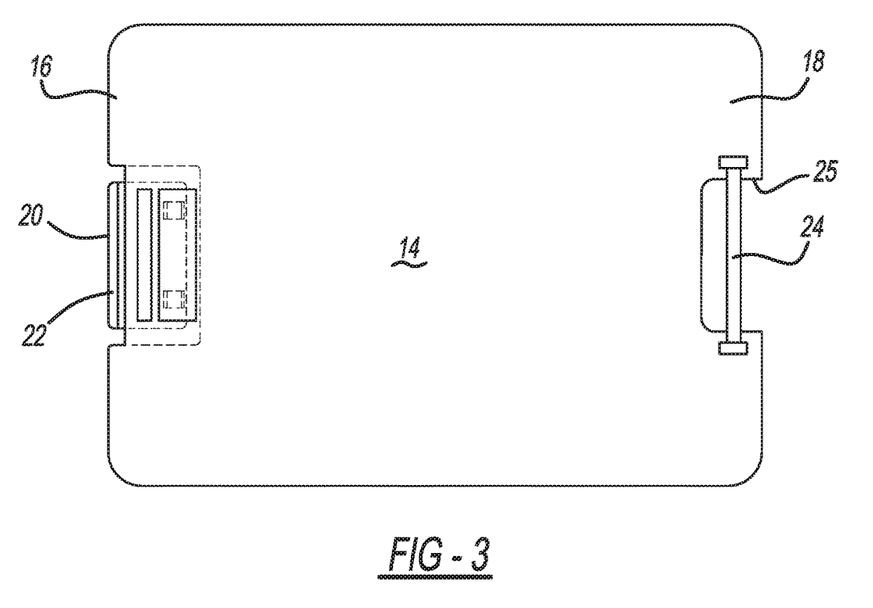
FIG. 3 is a bottom plan view of the engine cover of the disclosed inventive concept.

The engine cover 14 is itself illustrated in isolation in FIGS. 2 and 3 in which top and bottom side views of the engine cover 14 are respectively illustrated. The shape and size of the engine cover illustrated in FIGS. 2 and 3 are slightly different from the shape and size of the engine cover illustrated in FIG. 1 to illustrate the versatility of the disclosed inventive concept. The engine cover 14 includes a front end 16 and a back end 18. A latch handle assembly 20 is positioned at the front end 16 of the engine cover 14. The latch handle assembly 20 includes a releasable latch handle 22.

Attachment of the engine cover 14 to the engine may be achieved by any number of arrangements although a pivoting arrangement of the type illustrated in certain ones of the figures is the preferred arrangement. A hinge pivot rod 24 is formed across an opening 25 formed in the back end 18. The hinge pivot rod 24 is pivotably attached to the engine 12 as will be discussed below.

Figure 4:
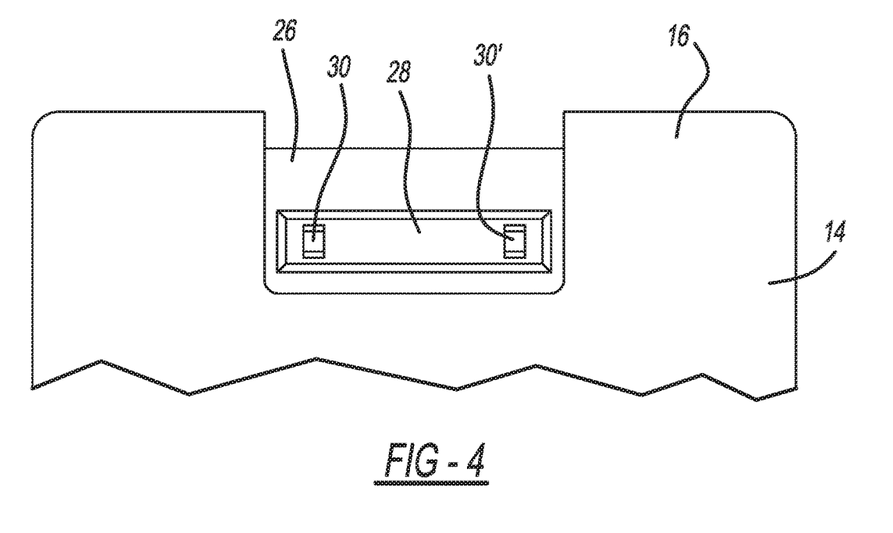
FIG. 4 is a view of a portion of the front end of the engine cover illustrating the rod attachment pockets of the handle assembly.

As previously noted, the engine cover 14 may be selectively moved from a closed position in which at least a portion of the engine 12 is concealed and an open position in which the concealed portion of the engine 12 is exposed. The latch handle assembly 20 maintains the engine cover 14 in its closed position. Selective release of the latch handle assembly 20 allows the engine cover 14 to be moved to its open position. As illustrated in FIG. 4, a recessed latch handle area 26 formed in the front end 16 of the engine cover 14. A latch handle attachment base 28 is provided in the recessed latch handle area 26. A pair of spaced-apart rod attachment pockets 30 and 30' extend from the latch handle attachment base 28.

Figure 5:
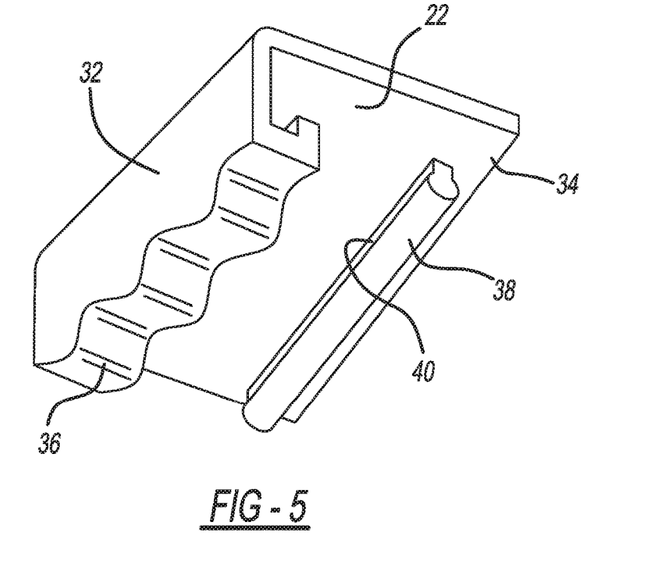
FIG. 5 is a perspective view of the cover handle of the handle assembly illustrating a portion of the underside of the handle.

The latch handle 22 is shown in isolation in FIG. 5 in which a perspective view of the latch handle 22 is illustrated. Like the engine cover 14, the latch handle 22 is preferably though not exclusively made of a rigid polymerized material, such as high-density polyethylene (HDPE). The latch handle 22 includes a front end 32 and a back end 34. The front end 32 includes a grip 36 defined by a surface that is optionally but preferably contoured to receive a user's fingers for operation.

The back end 34 of the latch handle 22 includes a pivoting assembly that preferably though not exclusively includes a pivot rod 38 that is attached to the back end 34 of the latch handle by a pivot rod attachment bridge 40. The pivot rod 38 may be attached to the underside of the latch handle 22 by an alternative construction.

Figure 6:
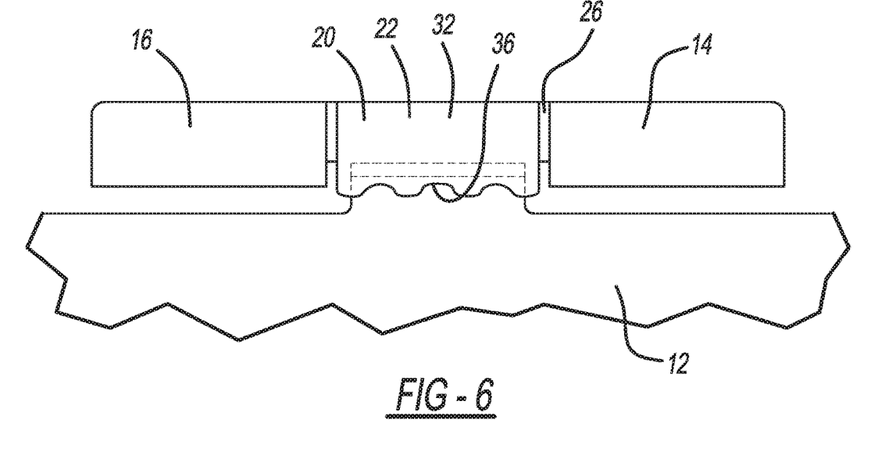
FIG. 6 is a front view of a portion of the vehicle engine and the engine cover illustrating the cover in its closed or concealing and noise-dampening position.

A front view of the latch handle assembly 20 is shown in FIG. 6. As illustrated, the latch handle 22 is generally provided in the recessed latch handle area 26 that is centrally formed in the front end 16 of the engine cover 14. As illustrated in FIG. 6 and in FIG. 7, the engine cover 14 is shown in its closed position relative to the engine 12.

Figure 7:
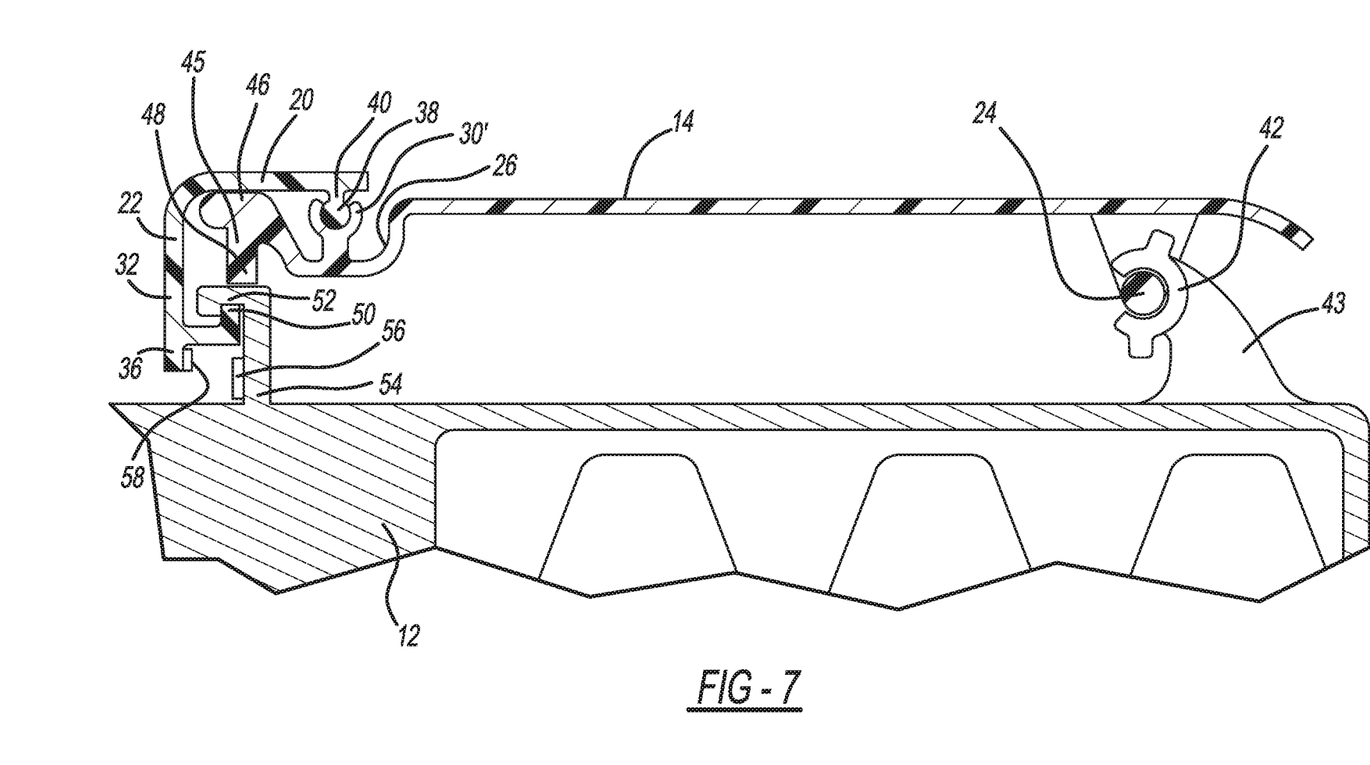
FIG. 7 is a sectional view of a portion of a vehicle engine and the engine cover according to the disclosed inventive concept attached thereto, the engine cover being in its closed or concealing and noise-dampening position.
Figure 8:
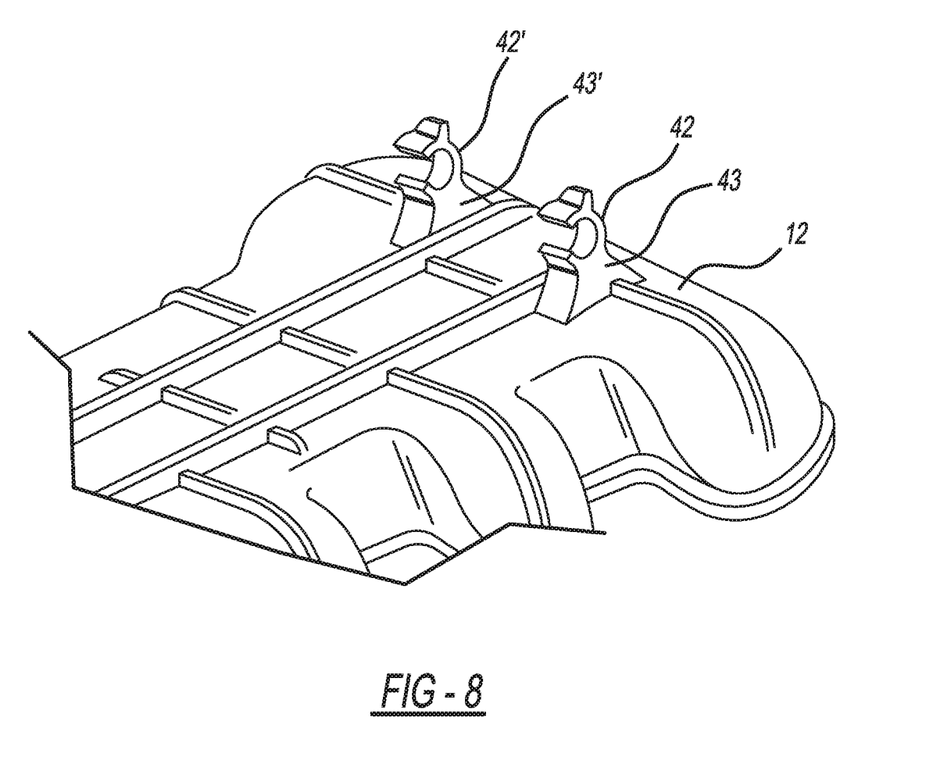
FIG. 8 is a perspective view of a portion of the vehicle engine and illustrating the rear hinge pockets integrally formed with the engine.

Referring to FIG. 7, a sectional view of a portion of a vehicle engine 12 and the engine cover 14 is illustrated in which the engine cover 14 is shown in its closed or engine concealing and noise-dampening position. While the front end 16 of the engine cover 14 includes the latch handle assembly 20 for releasable attachment to the vehicle engine 12, the back end 18 of the engine cover 14 is pivotably attached to the engine 12 by the hinge pivot rod 24 which is preferably though not exclusively attached to the engine 12 by a pocket arrangement. Specifically, and referring to both FIG. 7 and FIG. 8 (in FIG. 8 a portion of the engine 12 is illustrated), a pair of spaced apart rear hinge pockets 42 and 42' is provided. The rear hinge pocket 42 is attached to the engine 12 via a pocket bridge 43 while the rear hinge pocket 42' is attached to the engine 12 via a pocket bridge 43'. A greater or lesser number of rear hinge pockets may be provided. The pocket bridges 43 and 43' may be attached to virtually any point on the upper area of the engine 12.

The latch handle assembly 20 is provided in order to secure the front end 16 of the engine cover 14 to the engine 12 when the engine cover 14 is in its closed position as previously noted and as illustrated in FIG. 7. In addition to the latch handle 22, the latch handle assembly 20 comprises a locking base 45 formed as part of the engine cover 14 and provided at the forward portion of the recessed latch handle area 26. The locking base 45 includes an upper locking base stop 46 against which the latch handle 22 rests when in its locked position as illustrated in FIG. 7. The locking base 45 further includes a lower locking base stop 48 formed on the locking base 45 opposite the upper locking base stop 46.

Releasable attachment of the latch handle 22 to the engine 12 is made possible by two opposed and attachable latch hooks. Particularly, a latch handle hook 50 is formed on the underside of the latch handle 22 for selective, user-effected engagement with an engine hook latch 52 attached to the engine 12 via an engine hook bridge 54. In FIG. 7, the latch handle 22 is in its latching position in which the latch handle hook 50 has been moved to its engagement position whereby it is latched to the engine hook latch 52. The illustrated engagement prevents release of the latch handle 22 from its latched position and thereby maintains the engine cover 14 in its closed position.

Verification that the latch handle 22 is in its latched position made be made by sound or by sight or by both methods. As to audio verification, when the latch handle hook 50 engages the engine hook latch 52, an audible latching sound in the form of a snap is heard by the operator. As to video verification, the engine cover 14 may be provided with a video verification system that includes a camera 56 and a confirmation image such as a paint spot 58. When the latch handle 22 is in its latched position, the operator can verify attachment by referring to a remote screen (not shown) to confirm whether or not the paint spot 58 is in the correct location.

Figure 9:
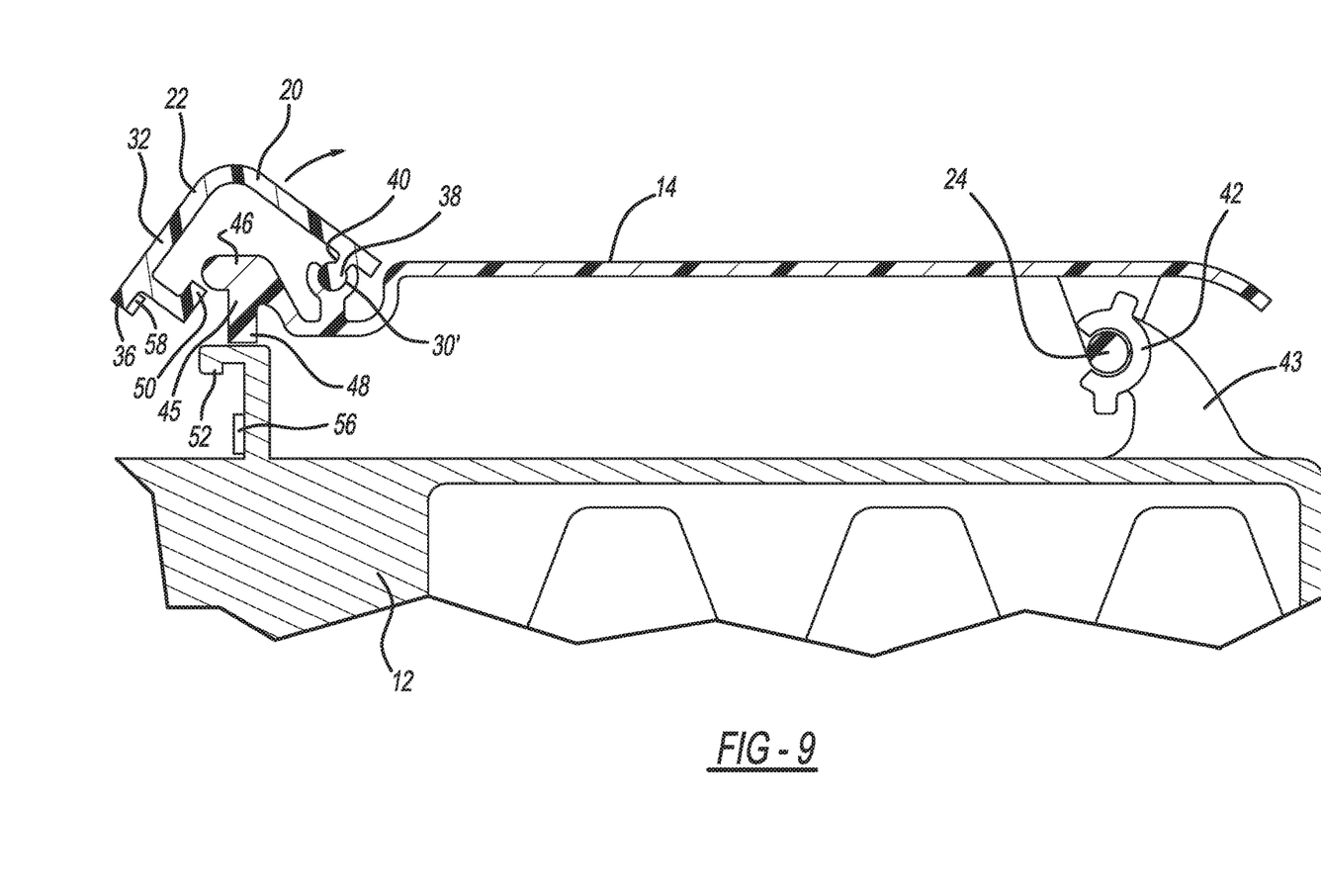
FIG. 9 is a sectional view of the engine and engine cover similar to that of FIG. 7 but illustrating the handle in its unlatched position while the cover is in its closed or concealing and noise-dampening position.

To move the engine cover 14 to its open and engine revealing position and referring to FIG. 9, the operator first grasps the latch handle 22 by first placing fingers onto the grip 36 and then lifting the latch handle 22 in a pivotable manner relative to the engine cover 14 so that the latch handle hook 50 is released from engagement with the engine hook latch 52. The release of the latch handle 22 from its position of engagement allows the latch handle 22 to be pivoted to its release position by the action of the pivot rod 38 relative to the attachment pockets 30 and 30' as illustrated in FIG. 9.

Figure 10:
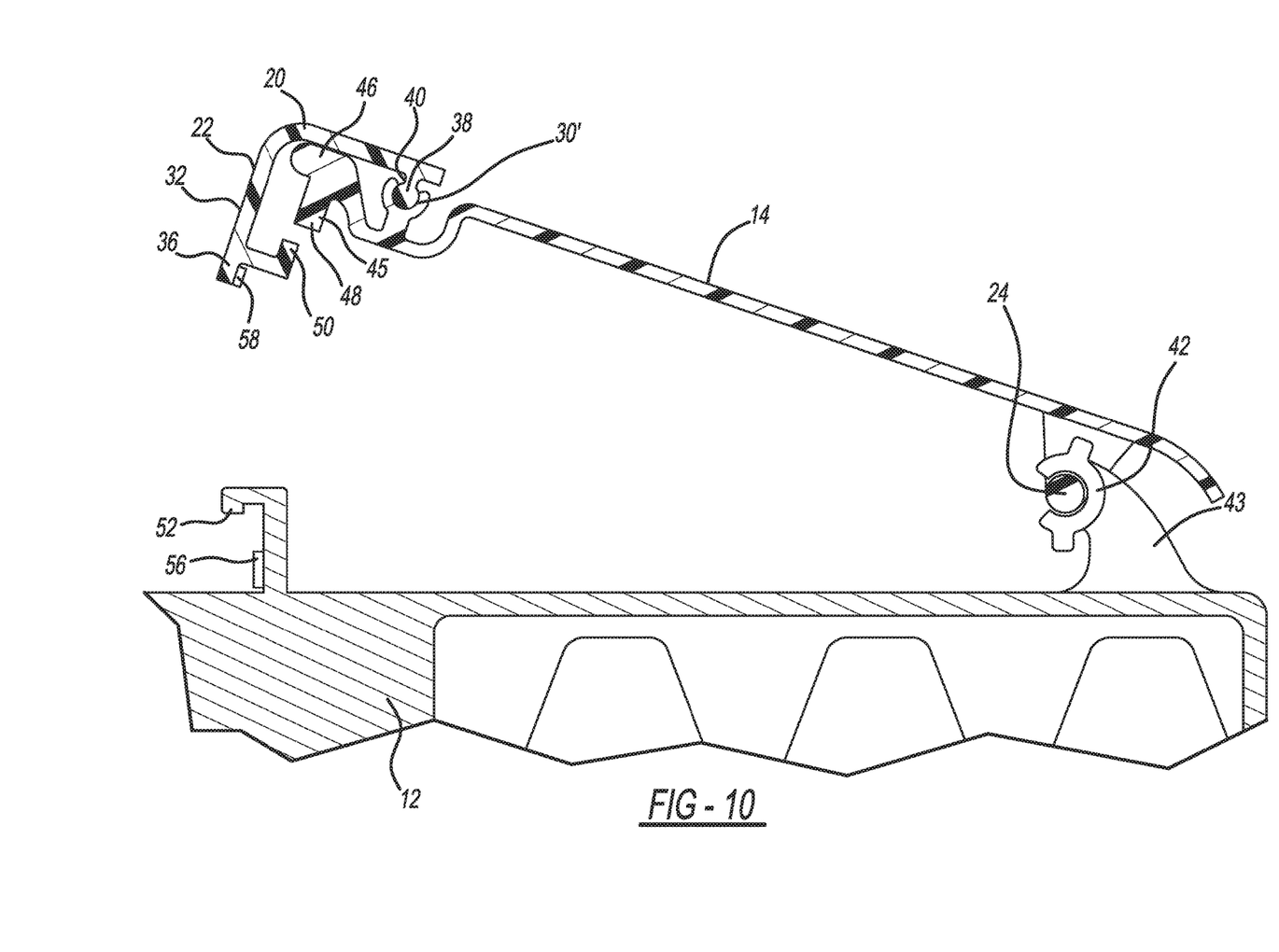
FIG. 10 is a sectional view of the engine and engine cover similar to that of FIG. 9 but illustrating the cover pivoted to its revealing position to allow access to the engine for servicing.

Once the latch handle 22 has been moved to its release position, the operator can then move the engine cover 14 to its engine-exposing position as illustrated in FIG. 10. As shown in that figure, the hinge pivot rod 24 has been rotated relative to the rear hinge pocket 42 thus allowing the engine cover 14 to be moved so that the underlying engine 12 is almost fully revealed. Movement of the engine cover 14 to its closed position is accomplished by reversing the operation just described.

The engine cover of the disclosed inventive concept is both aesthetically pleasing and functional. As noted above, the upper surface of one or both of the cover and the latch handle may include vehicle badging. Because it is preferably formed from a polymerized material, the cover may have a molded-in color to match the vehicle body color. The engine cover is also functional in that it is an effective tool for reducing engine noise. The reduction of engine noise may be further improved by including an insulating material on the underside of the engine cover. The cover is lightweight (less than about ten pounds) can be easily installed without tools into a hinge on the engine (current designs have the intake manifold hosting the hinge). When lowered, the engine cover will come into contact with the engine, where the latch handle assembly is lowered to engage the latch hook on the engine. Latching is itself accomplished by way of the hook-to-hook engagement of the latch handle to the hook of the engine handle attachment assembly with suitable engagement force and can be tuned to have a high retention force.

In use, the disclosed inventive concept provides a cost-effective and easy way of attaching an engine cover to an engine compared with known techniques. By providing an engine cover assembly according to the disclosed inventive concept that includes a hinged arrangement for attachment to the engine and a practical and effective latch handle assembly, multiple fasteners used in known technology are eliminated and the number of production steps required to properly attach the engine cover assembly to the engine is significantly reduced. In the same manner, only a simple movement of the latch of the latch assembly is required to open the cover to allow access to the engine as needed. Installation confirmation is easy and immediate by either an audible confirmation by way of a snap sound generated when the hook of the latch handle engages the hook of the engine latch or by video confirmation generated by the camera arrangement.

Thus, the disclosed invention as set forth above overcomes the challenges faced by known engine cover assemblies by increasing ease of assembly and ease of use. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A vehicle engine assembly comprising:
   an engine having a first cover attachment element and a handle catch including an engine latch hook; and
   an engine cover pivotably movable between a closed position in which a portion of the engine is concealed and an open position, said engine cover having a latch handle assembly, a handle attachment element, and an engine attachment element attachable to said first cover attachment element, said latch handle assembly including a latch handle pivotably attached to said cover, said latch handle including a second cover attachment element,
   wherein said second cover attachment element is one of a pivot rod or a rod attachment pocket and said handle attachment element is the other of a rod attachment pocket or a pivot rod.

2. The vehicle engine assembly of claim 1 wherein said latch handle includes a handle latch hook for selective engagement with said engine latch hook.

3. The vehicle engine assembly of claim 2 wherein said engine cover includes a latch handle assembly end to which said latch handle is pivotably attached, said latch handle assembly end including an engine latch hook stop and said engine latch hook including a cover stop, said stops contacting one another when said engine cover is in said closed position.

4. The vehicle engine assembly of claim 3 wherein said engine cover includes a recessed area and wherein said handle attachment element is provided substantially within said recessed area.

5. The vehicle engine assembly of claim 1 wherein said latch handle includes an underside and said latch handle assembly end includes a locking handle stop.

6. The vehicle engine assembly of claim 5 wherein said latch handle is selectively movable between a locked position in which said handle latch hook frictionally engages said engine latch hook and an unlocked position in which said handle latch hook is disengaged from said engine latch hook wherein a portion of said underside of said latch handle engages said locking handle stop when said latch handle is in said locked position.

7. The vehicle engine assembly of claim 1 further including a latch position verification system.

8. The vehicle engine assembly of claim 7, wherein said latch position verification system comprises an imaging device.

9. The vehicle engine assembly of claim 8, wherein said imaging device is a camera.

10. A vehicle engine assembly comprising:
an engine having a first cover attachment element and a handle catch;
an engine cover pivotably movable between a closed position in which a portion of the engine is concealed and an open position, said engine cover having a latch handle assembly, a handle attachment element, and an engine attachment element attachable to said first cover attachment element, said latch handle assembly including a movable latch handle, said latch handle being engageable with said handle catch; and
a latch position verification system comprising an imaging device.

11. The vehicle engine assembly of claim 10 wherein said handle catch of said engine includes an engine latch hook.

12. The vehicle engine assembly of claim 11 wherein said movable latch handle is pivotably attached to said cover.

13. The vehicle engine assembly of claim 12 wherein said latch handle includes a handle latch hook for selective engagement with said engine latch hook.

14. The vehicle engine assembly of claim 13 wherein said cover includes a latch handle assembly end to which said latch handle is pivotably attached, said latch handle assembly end including an engine latch hook stop and said engine latch hook including a cover stop, said stops contacting one another when said engine cover is in said closed position.

15. The vehicle engine assembly of claim 14 wherein said latch handle includes a second cover attachment element, said second cover attachment element being one of a pivot rod or a rod attachment pocket and said engine cover includes a handle attachment element, said handle attachment element being the other of a rod attachment pocket or a pivot rod.

16. The vehicle engine assembly of claim 15 wherein said engine cover includes a recessed area and wherein said handle attachment element is provided substantially within said recessed area.

17. The vehicle engine assembly of claim 16 wherein said latch handle includes an underside and said latch handle assembly end includes a locking handle stop and wherein said latch handle is selectively movable between a locked position in which said handle latch hook frictionally engages said engine latch hook and an unlocked position in which said handle latch hook is disengaged from said engine latch hook whereby a portion of said underside of said latch handle engages said locking handle stop when said latch handle is in its locked position.

18. The vehicle engine assembly of claim 10 wherein said imaging device is a camera.

19. A vehicle engine assembly comprising:
an engine having a first cover attachment element and a handle catch including an engine latch hook; and
an engine cover pivotably attached to said first cover attachment element about a first axis and movable between a closed position and an open position, said cover having a latch handle assembly and a handle attachment element, said latch handle assembly including a movable latch handle pivotably attached to said cover about a second axis, said second axis being parallel to said first axis, said latch handle having a second cover attachment element and a handle latch hook that is engageable with said engine latch hook,
wherein said second cover attachment element is one of a pivot rod or a rod attachment pocket and said handle attachment element is the other of a rod attachment pocket or a pivot rod.

* * * * *